United States Patent
Schildermans et al.

(10) Patent No.: US 8,784,539 B2
(45) Date of Patent: Jul. 22, 2014

(54) DIESEL SOOT PARTICULATE FILTER CARTRIDGE

(75) Inventors: Inge Schildermans, Marke (BE); Johan Vandamme, Deinze (BE); Frank Verschaeve, Otegem (BE)

(73) Assignee: NV Bekaert SA, Zwevegem (BE)

( * ) Notice: Subject to any disclaimer, the term of this patent is extended or adjusted under 35 U.S.C. 154(b) by 13 days.

(21) Appl. No.: 13/380,181

(22) PCT Filed: Jun. 23, 2010

(86) PCT No.: PCT/EP2010/058894
§ 371 (c)(1),
(2), (4) Date: Dec. 22, 2011

(87) PCT Pub. No.: WO2010/149693
PCT Pub. Date: Dec. 29, 2010

(65) Prior Publication Data
US 2012/0111199 A1    May 10, 2012

(30) Foreign Application Priority Data
Jun. 25, 2009 (EP) ..................................... 09163759

(51) Int. Cl.
B01D 46/00 (2006.01)
B01D 50/00 (2006.01)
B01D 24/00 (2006.01)
B01D 39/14 (2006.01)
B01D 39/06 (2006.01)
F01D 3/00 (2006.01)

(52) U.S. Cl.
USPC ................ 95/286; 60/297; 55/282.3; 55/522; 55/523; 55/524

(58) Field of Classification Search
USPC .............. 55/282.3, 522–524; 60/297; 95/286
See application file for complete search history.

(56) References Cited

U.S. PATENT DOCUMENTS

| 3,815,337 A | 6/1974 | Lenane |
| 4,664,971 A | 5/1987 | Soens |
| 4,900,517 A | 2/1990 | Domesle et al. |
| 5,165,899 A | 11/1992 | Delaunay et al. |

(Continued)

FOREIGN PATENT DOCUMENTS

| DE | 195 24 399 A1 | 1/1997 |
| DE | 198 53 460 A1 | 5/2000 |

(Continued)

OTHER PUBLICATIONS

Inge Schildermans et al., U.S. Restriction Office Action, U.S. Appl. No. 13/380,162, dated Mar. 11, 2013, (6 pages).

(Continued)

Primary Examiner — Amber Orlando
(74) Attorney, Agent, or Firm — Foley & Lardner LLP

(57) ABSTRACT

The invention relates to diesel soot particulate filter cartridge having a central filter cartridge axis. The filter cartridge has a radial flow. The filter cartridge comprises a porous structure. The porous structure is coiled around the central filter cartridge axis. The porous structure comprises non-sintered metal fibers, said fibers having a roughness being higher than 1.7. The invention further relates to a method of manufacturing a diesel soot particulate filter cartridge. Furthermore the invention relates to a multicartridge diesel soot particulate filter. The flow through the multicartridge diesel soot particulate filter is axial while the flow through the filter cartridges is radial.

13 Claims, 7 Drawing Sheets

(56) References Cited

U.S. PATENT DOCUMENTS

| | | | |
|---|---|---|---|
| 5,409,669 A | 4/1995 | Smith et al. | |
| 5,873,918 A | 2/1999 | Dillman et al. | |
| 7,052,532 B1 * | 5/2006 | Liu et al. | 96/154 |
| 8,308,855 B2 * | 11/2012 | Togashi et al. | 96/134 |
| 2004/0055262 A1 | 3/2004 | Zettel | |
| 2006/0254426 A1 * | 11/2006 | Liu et al. | 96/154 |

FOREIGN PATENT DOCUMENTS

| | | |
|---|---|---|
| DE | 103 48 626 A1 | 5/2005 |
| EP | 0 230 579 A1 | 8/1987 |
| EP | 0 280 340 B1 | 3/1991 |
| EP | 1 317 950 A1 | 6/2003 |
| JP | 3083144 B2 | 9/2000 |
| WO | WO 02/057035 A1 | 7/2002 |
| WO | WO 2005/030373 A1 | 4/2005 |
| WO | WO 2006/130654 A1 | 12/2006 |
| WO | WO 2007/079829 A1 | 7/2007 |
| WO | WO 2009/010499 A1 | 1/2009 |

OTHER PUBLICATIONS

U.S. Appl. No. 13/380,162, filed Dec. 22, 2011, Schildermans.
Inge Schildermans et al., U.S. Non-Final Office Action, U.S. Appl. No. 13/380,162, dated Apr. 23, 2013, (16 pages).
Inge Schildermans et al., U.S. Final Office Action, U.S. Appl. No. 13/380,162, dated Sep. 19, 2013, (23 pages).

* cited by examiner

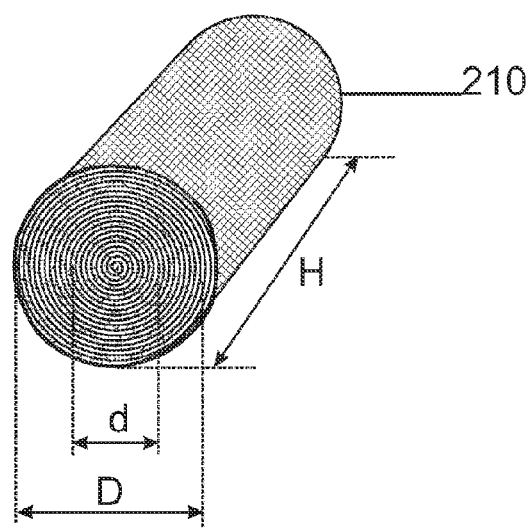
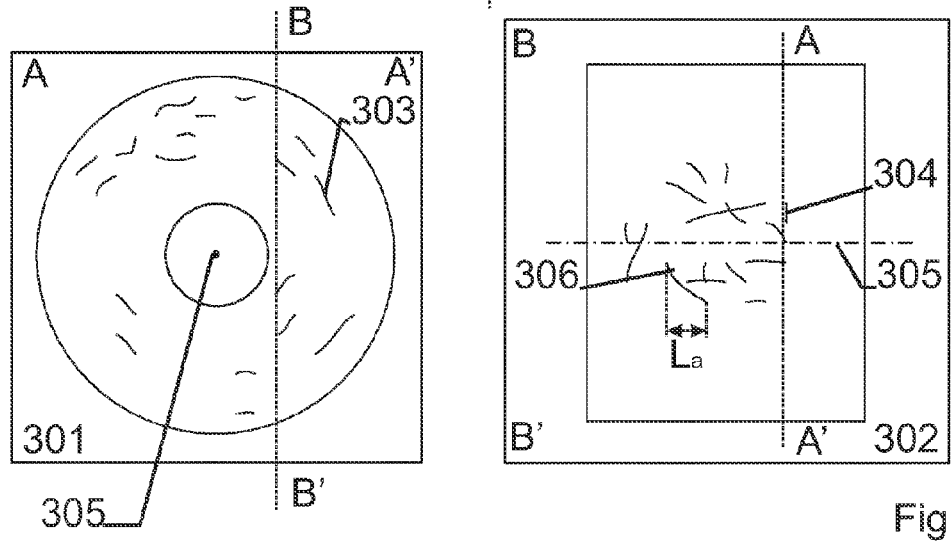
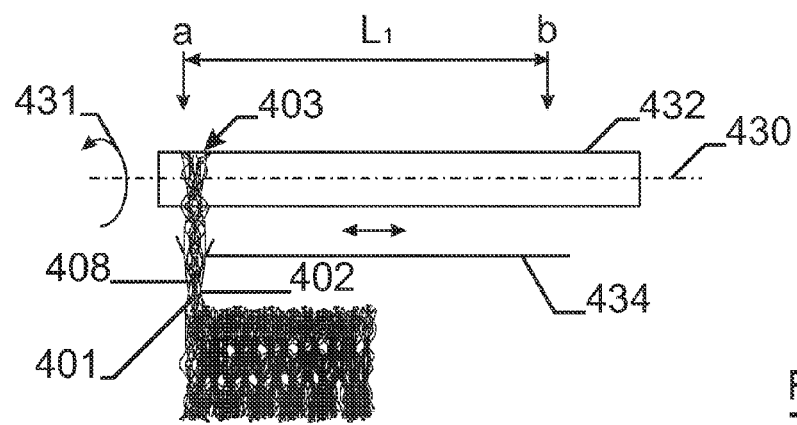

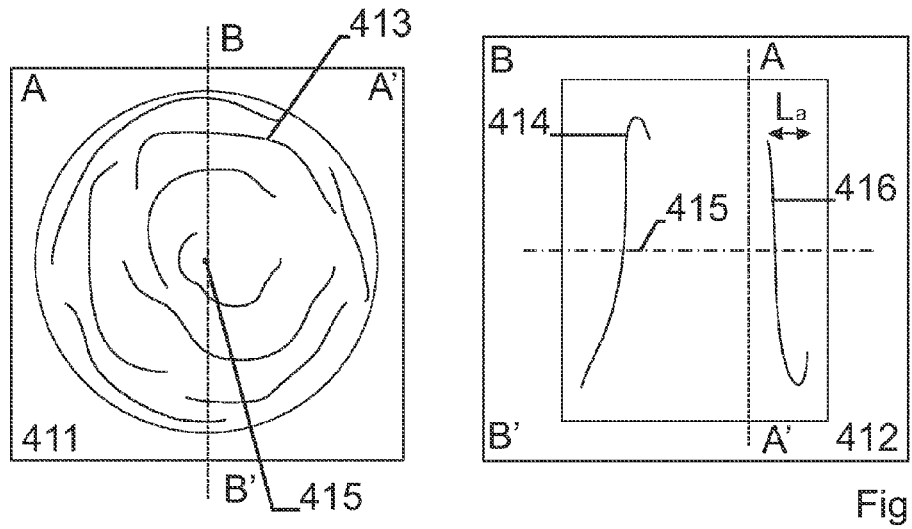
Fig. 7
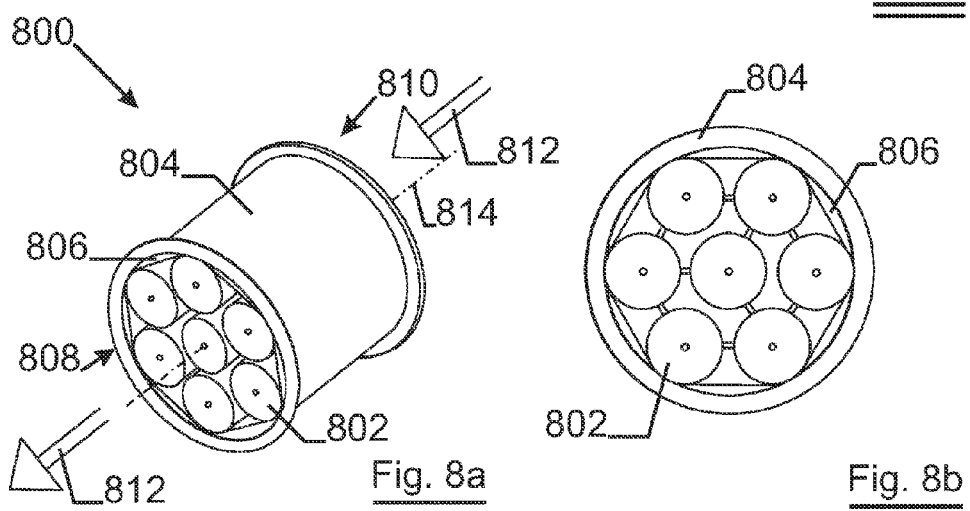
Fig. 8a  Fig. 8b
Fig. 8c

DIESEL SOOT PARTICULATE FILTER CARTRIDGE

TECHNICAL FIELD

The invention relates to a radial diesel soot particulate filter cartridge and to a method of manufacturing such a filter cartridge.

The invention further relates to a multicartridge filter comprising a number of radial filter cartridges and to a method of manufacturing such a multicartridge filter.

BACKGROUND ART

Diesel soot particulate filters comprising metal fibers are for example known from WO 2007/079829. Filters of this type are called axial filters as the flow is axial. However, this type of filter has a number of drawbacks such as a limited flow in area and a relatively high pressure drop.

Also ceramic filters are known in the art for the filtration of diesel exhaust. However, they are characterized by a high thermal mass resulting in long regeneration times. Furthermore, their mass efficiency is not tunable.

DISCLOSURE OF INVENTION

It is an object of the present invention to provide a diesel soot particulate filter cartridge avoiding the drawbacks of the prior art.

It is another object of the invention to provide a filter cartridge comprising a porous structure of metal fibers, whereby the fibers have a high roughness.

It is a further object to provide a filter cartridge having a radial flow.

It is a further object to provide a filter cartridge characterized by a high flow in surface area and a low pressure drop.

It is still an object to provide a filter cartridge with a decreased risk on hot spots.

It is a further object of the invention to provide a multicartridge diesel soot particulate filter comprising a number of radial filter cartridges having a low pressure drop and a large flow in filtration surface area.

It is still a further object of the invention to provide a multicartridge diesel soot particulate filter having a high flexibility, for example to allow the filter to be incorporated in an existing muffler design independent of shape.

It is still another object of the invention to provide a multicartridge diesel soot particulate filter having a tunable mass efficiency.

It is still a further object of the invention to provide a multicartridge diesel soot particulate filter having reduced costs of assembly, mounting and maintenance using the modular multicartridge concept of the present invention.

According to a first aspect of the present invention a radial diesel soot particulate filter cartridge is provided. The filter cartridge has a central filter cartridge axis. The filter cartridge has a radial flow.

The filter cartridge comprises a porous structure. The porous structure preferably comprises non-sintered metal fibers. The metal fibers have a roughness higher than 1.7, for example higher than 1.9, higher than 2 or higher than 2.5.

For the purpose of this invention "roughness" is defined as the ratio of the perimeter of a cross-section of a particular fiber to the perimeter of a cross-section of an imaginary fiber having a circular radial cross-section of which the surface area is identical to the average of the surface areas of cross-sections of this particular fiber. The diameter of this imaginary fiber is called the equivalent diameter.

For the purpose of this invention with "cross-section" is meant the cross-section when a fiber is cut perpendicular to the major axis of the fiber.

The radial flow of the filter cartridge can be from the outside of the filter element to the inside of the filter cartridge. This means that the inlet flow is radially inwards the filter cartridge while the outlet flow is substantially parallel with the central filter cartridge axis and is thus in the axial direction.

Alternatively, the inlet flow of the filter cartridge is parallel with the central filter cartridge axis and the outlet flow is radially outwards of the filter cartridge. In this case the inlet flow is in the axial direction and the outlet flow is radially outwards.

A filter cartridge according to the present invention comprises a porous structure of non-sintered metal fibers. The roughness of these non-sintered metal fibers is high. Surprisingly it has been noticed that metal fibers with such roughness are very efficient for diesel soot particulate filtration as they capture particles in an efficient way.

Any suitable type of metal or metal alloy may be used to provide the metal fibers. The metal fibers are for example made of steel such as stainless steel. Possible stainless steel alloys are AISI 300 or AISI 400-serie alloys, such as AISI 316L or AISI 347, or alloys comprising iron, Aluminum and Chromium, stainless steel comprising Chromium, Aluminum and/or Nickel and 0.05 to 0.3% by weight of Yttrium, Cerium, Lanthanum, Hafnium or Titanium, such as e.g. DIN 1.4767 alloys or Fecralloy®, are used. Also Copper or Copper-alloys, or Titanium or Titanium alloys may be used. The metal fibers can also be made of Nickel or a Nickel alloy.

Preferred alloys are alloys comprising Fe, Al and Cr, stainless steel comprising Chromium, Aluminum and/or Nickel and 0.05 to 0.3% by weight of Yttrium, Cerium, Lanthanum, Hafnium or Titanium, such as e.g. DIN 1.4767 alloys or Fecralloy®, are used.

It has been noticed that metal fibers made of alloys comprising Fe, Al and Cr, stainless steel comprising Chromium, Aluminum and/or Nickel and 0.05 to 0.3% by weight of Yttrium, Cerium, Lanthanum, Hafnium or Titanium having a roughness being higher than 1.7 are most efficient for diesel soot particulate filtration.

Metal fibers may be made by any known metal fiber production method, e.g. by bundle drawing operation, by coil shaving operation as described in JP3083144, by wire shaving operations (such as steel wool) or by a method providing metal fibers from a bath of molten metal alloy.

In order to provide the metal fibers with their average length, the metal fibers may be cut using the method as described in WO02/057035, or by using the method to provide metal fiber grains such as described in U.S. Pat. No. 4,664,971, or may be stretch broken.

Preferably the equivalent diameter D of the metal fibers is less than 100 µm such as less than 65 µm, more preferably less than 36 µm such as 35 µm, 22 µm or 17 µm. Optionally the equivalent diameter of the metal fibers is less than 15 µm, such as 14 µm, 12 µm or 11 µm, or even less than 9 µm such as e.g. 8 µm. Optionally the equivalent diameter D of the metal fibers is less than 7 µm or less than 6 µm, e.g. less than 5 µm, such as 1 µm, 1.5 µm, 2 µm, 3 µm, 3.5 µm, or 4 µm.

The metal fibers may be endless metal fibers, endless fibers being also known as filaments, or may have an average fiber length $L_{fiber}$, optionally ranging from e.g. 0.1 cm to 5 cm.

According to some embodiments of the present invention, the porous structure is coiled about the central filter cartridge axis.

In a preferred embodiment, the porous structure is coiled about a conduit, preferably about a central conduit. The conduit is preferably gas permeable and comprises for example a perforated tube, a spiral wound tube or a wire cage. The conduit can be made of a metal or metal alloy. Optionally, the conduit is provided from a similar or identical metal alloy as used to provide the metal fibers.

The porous structure may be a fiber web. The fiber web may be a fiber web obtained by any suitable web forming process, such as air laid web, wet laid web or carded web. The web is preferably a non-woven web, optionally needle punched.

In case a web comprising metal fibers is used, the web may be provided by air laid or wet laid processes. The metal fiber web may e.g. have a thickness of 1 mm to 50 mm and a surface weight of 100 g/m$^2$ to 600 g/m$^2$.

Alternatively, the porous structure may comprise at least one fiber bundle. The bundle may be a bundle of coil shaved metal fibers. Alternatively the bundle may be a bundle of metal fibers obtained by bundle drawing. The bundle drawn metal fibers are optionally crimped fibers, e.g. by means of the method as set out in EP280340.

The bundle may comprise a plurality of metal fibers, such as in the range of 200 to 10000 fibers or filaments, or even more.

The porous structure may comprise at least one, optionally a plurality of identical or mutually different bundles, differing in type of fibers, fiber properties, such as fiber equivalent diameter or fiber material, or bundle properties such as bundle fineness.

The fiber bundle may be a fiber bundle obtained by any suitable bundle forming process. As an example, the fiber bundle may be a card sliver.

The porous structure, such as a web or at least one fiber bundle, which is coiled or wound about an axis parallel to one of its edges, optionally wound about the edge itself, may have the tendency to expand radially. Therefore it can be preferred that a reinforcing structure is coiled around the coiled consolidated fiber structure.

The filter cartridges may further comprise powder such as metal powder particles, and/or may comprise catalytic components.

The height of a filter cartridge, is not considered to be a limitation on the present invention. It may range e.g. from 2 cm to 20 cm, such as typically 5 cm.

The porous material of a filter cartridge may have a porosity of e.g. 70% to 99%. The porosity of the filter cartridge may be uniform along the height of the filter cartridge, or may vary along the height of the filter cartridge. The porosity may vary gradually or stepwise from the inflow side to the outflow side, with the porosity at the inflow side being larger than at the outflow side.

The surface area of cross-sections of a filter cartridge according to a plane perpendicular to the average flow path may be uniform along the height of the filter cartridge (such as in case of cylindrical filter cartridges) or may vary (such as in case of conical filter cartridges). The surface area of a cross-section according to a plane perpendicular to the average flow path may range from e.g. 450 mm$^2$ to 100000 mm$^2$, such as in the range of 450 mm$^2$ to 13000 mm$^2$, such as e.g. 12500 mm$^2$ or 96200 mm$^2$.

In a preferred embodiment a filter cartridge comprises a mainly conical cavity in axial direction and/or a mainly conical extension in axial direction. Particularly the conical cavity may be positioned at the inflow side and the conical extension may be positioned at the outflow side. Due to the conical cavity the surface of the filter cartridge at the inflow side is increased. In such an embodiment clogging of the filter cartridge at the inflow side is delayed or even prevented.

Particularly the conical cavity and the conical extension are shaped mainly identical for providing an axial surface to surface contact of adjacent positioned filter materials. Neighbouring filter cartridges may be stuck tougher by inserting the conical extension of the one filter material into the conical cavity of the other filter material. It is understood, that the wording "conical" also means shapes like a frustrum, or comprising a cross-section of a triangle or a cross-section of a partial circle or ellipsoid.

In one embodiment a filter cartridge according to the present invention comprises fibers of which a majority of the fibers, such as at least 50% or at least 85%, at least partially encircle the central axis of the diesel soot particulate filter.

A filter cartridge is characterized by a flow in surface $S_{fi\ cartridge}$. The flow in surface of a filter cartridge $S_{fi\ cartridge}$ is defined as the surface of a filter cartridge coming in contact with the incoming flow of the liquid or gas to be filtered, in particular with the incoming flow of diesel exhaust to be filtered.

For a filter cartridge having a radial flow from the outside to the inside of the filter cartridge, the flow in surface of a filter cartridge $S_{fi\ cartridge}$ corresponds with the outer mantle surface of the filter cartridge. For a cylindrical filter cartridge, flow in surface $S_{fi\ cartridge}$ is equal to A*H wherein A is the circumference of the cross-section of the filter cartridge, and H is the height of the filter cartridge.

According to the present invention, the filter cartridge preferably has a ratio $$\frac{\text{flow in surface filter cartridge } S_{fi\ cartridge}}{\text{volume filter cartride} V_{cartridge}}$$

ranging between 0.01 and 0.1 m$^2$/l.

More preferably, the ratio $$\frac{\text{flow in surface filter cartridge } S_{fi\ cartridge}}{\text{volume filter cartride} V_{cartridge}}$$

ranges between 0.03 m$^2$/l and 0.06 m$^2$/l such as 0.04 m$^2$/l or 0.05 m$^2$/l.

According to a second aspect of the present invention, a method to provide a filter cartridge as described above is defined. The method to manufacture a filter cartridge comprises the steps of:

providing a porous structure having at least a leading edge;

coiling said porous structure, parallel to said leading edge, until the predetermined diameter, being said outer diameter of said filter cartridge is obtained.

An alternative method to manufacture a filter cartridge according to the present invention comprises the steps of providing a porous structure having at least a leading edge;

providing a conduit, said conduit having a diameter almost equal to the internal diameter of said filter cartridge;

coiling said porous structure onto said conduit, parallel to said leading edge, until the predetermined diameter, being said outer diameter of said filter cartridge, is obtained.

Optionally, the method according to the present invention further comprises the steps of
- providing a reinforcing structure having at least a mesh leading edge;
- coiling said reinforcing structure around the coiled porous structure, parallel to said mesh leading edge.

The reinforcing structure is for example a mesh, a foil, a sheet or a plate. Optionally, the reinforcing structure is sintered to the coiled porous structure.

According to a third aspect of the present invention, a multicartridge diesel soot particulate filter comprising a number of radial diesel soot particulate filter cartridges as described above is provided. The multicartridge filter comprises a casing delimiting the outer boundary of a volume called the filter volume. The multicartridge filter has a central filter axis. The casing and the filter volume have an inflow side having at least one filter inlet and an outflow side having at least one filter outlet. The inflow side and the outflow side define an average flow direction. The average flow direction is substantially parallel to the central filter axis. This means that the average flow through the multicartridge diesel soot particulate filter is an axial flow.

The casing delimits the outer boundary of the filter volume in the direction of the average flow path.

The casing is gas impermeable in a radial direction. The filter volume is filled with a number of diesel soot particulate filter cartridges. The central filter cartridge axis is substantially parallel to the average flow direction of the filter and thus substantially parallel to the central filter axis. Preferably, the number of filter inlets at the inflow side is at least one and maximum equal to the number of filter cartridges; the number of filter outlets at the outflow side is at least one and maximum equal to the number of filter cartridges. In a preferred embodiment the number of filter outlets at the outflow side is equal to the number of filter outlets.

As mentioned above, the filter cartridges provide a radial flow direction through the porous structure. The filter cartridges are thus permeable in radial direction.

Although the average flow through the multicartridge filter is an axial flow, the flow through an individual filter cartridge filter is a radial flow.

The casing is delimiting a volume called the filter volume. The casing may comprise any material that allows to make the filter volume to be impermeable in the radial direction. In case metal fibers are used, the casing may be a metal casing, optionally provided from a similar or identical metal alloy as used to provide the metal fibers.

A preferred casing comprises a metal tube or a metal foil.

The filter volume may have any shape, as for example a cylindrical shape having a circular cross-section or a shape having an elliptical cross-section. The filter volume may optionally be conical, e.g. having a circular or an elliptical cross-section.

The filter volume is filled with a number of filter cartridges. The number of filter cartridges is at least 2. In principle there is no limitation in the upper limit of the number of filter cartridges. The number of filter cartridges is for example 2, 4, 7, 20, 37, . . . .

The filter cartridges can be positioned within the filter volume in different ways. The filter cartridges can for example be positioned distributed over the filter volume in such a way that there are no central filter cartridges. An example comprises a filter volume comprising 4 filter cartridges. Alternatively, the filter cartridges can be positioned in such a way that one or more filter cartridges are positioned centrally and a number of filter cartridges are positioned in a first layer around the centrally positioned filter cartridge(s).

Possibly, a number of filter cartridges are positioned in a second layer around the first layer. In principle, there is no limitation to the number of layers of filter cartridges. A first example of such configurations comprises one centrally positioned filter cartridges surrounded by six filter cartridges positioned around the centrally positioned filter cartridge in a first layer, shortly denoted as 1+6. A further example comprises one central filter cartridge, surrounded by six filter cartridges positioned in a first layer around the central filter cartridge, surrounded by twelve filter cartridges in a second layer, surrounded by eighteen filter cartridges in a third layer, shortly denoted as 1+6+12+18.

The multicartridge filter is characterized by a total flow in surface $S_{fi\ total}$. The total flow in surface $S_{fi\ total}$ is the sum of the flow in surfaces $S_{fi\ cartridge}$ of the individual filter cartridges of the multicartridge filter.

According to the present invention, the multicartridge filter according to the present invention comprises filter cartridges having a ratio $$\frac{\text{flow in surface filter cartridge } S_{fi\ cartridge}}{\text{volume filter cartride} V_{cartridge}}$$

ranging between 0.01 and 0.1 $m^2/l$. More preferably, the ratio $$\frac{\text{flow in surface filter cartridge } S_{fi\ cartridge}}{\text{volume filter cartride} V_{cartridge}}$$

ranges between 0.03 $m^2/l$ and 0.06 $m^2/l$ such as 0.04 $m^2/l$ or 0.05 $m^2/l$.

Furthermore, the ratio $$\frac{\text{total flow in surface filter } S_{fi\ total}}{\text{power of the engine}}$$

is preferably ranging between 0.001 $m^2/kW$ and 0.01 $m^2/kW$ and more preferably between 0.002 $m^2/kW$ and 0.005 $m^2/kW$, as for example 0.003 $m^2/kW$ or 0.004 $m^2/kW$.

A multicartridge diesel soot particulate filter according to the present invention is in particular suitable to be used for high power engines, such as engines having a power higher than 350 kW, for example higher than 420 kW. Examples of such engines are engines installed in heavy duty on road (trucks) and off road engines as for example gensets, construction equipment, agricultural equipment, locomotives and marines engines.

The multicartridge diesel soot particulate filter according to the present invention has a number of advantages compared to diesel soot particulate filters known in the art.

One advantage is that the mass efficiency of the filter is tunable for example by choosing the fiber weight, the fiber diameter, the porosity of the filter cartridges, the size of the filter cartridges, the configuration of the filter cartridges within the casing, . . . . Mass efficiency is defined as the percentage of weigh reduction before and after filtering determined by gravimetic measurement.

Furthermore the design of a filter cartridge is flexible for example by choosing the fiber weight, the fiber diameter, the porosity of the filter cartridge, the size of the filter cartridge, . . . .

There are no limitations in the shape of the casing. For each shape of casing the optimum number, size and type of filter cartridges can be chosen.

Due to the low thermal mass the regeneration cycles are shortened.

The material allows to obtain a high mechanical stability. Furthermore, the fine particulate efficiency of the multicartridge filter according to the present invention is high.

Compared to SiC filters the weight of a multicartridge filter according to the present invention is reduced. Weight savings up to 65% or even up to 80% are possible. This reduction in weight allows positioning of the multicartridge filter closer the engine.

The assembly of the multicartridge filter is easy.

An additional advantage is that the integration of other functionalities is possible, for example the integration of noise attenuation.

According to a fourth aspect of the present invention, a method to provide a multicartridge diesel soot particulate filter is provided. The method comprises the following steps providing a number of filter cartridges, said filter cartridges comprising a porous structure comprising metal fibers, said filter cartridges having a central filter cartridge axis, n axis, said filter cartridges providing a radial flow direction through said porous structure;

positioning said number of filter cartridges in a casing, said casing having an inflow side and an outflow side defining an average flow direction, said casing being gas impermeable in a radial direction, whereby said filter cartridges are positioned in said casing in such a way that said central filter cartridge axis of said filter cartridges is substantially parallel to the average flow direction of said filter.

BRIEF DESCRIPTION OF FIGURES IN THE DRAWINGS

The invention will now be described into more detail with reference to the accompanying drawings wherein FIGS. 1a to 1d show schematically some of the consecutive steps of a method to provide a filter cartridge comprising a fiber web.

FIGS. 2a to 2c show schematically some of the consecutive steps of a method to provide an alternative filter cartridge comprising a fiber web.

FIG. 3 shows views of the projections of fibers present in a filter cartridge comprising a fiber web.

FIGS. 4a to 4c show schematically some of the consecutive steps of a method to provide a filter cartridge comprising a bundle of fibers.

FIG. 7 shows views of the projections of fibers present in a filter cartridge comprising a bundle of fibers.

FIGS. 8a to 8c show a multicartridge diesel soot particulate filter according to the present invention.

MODE(S) FOR CARRYING OUT THE INVENTION

Figure 1A:
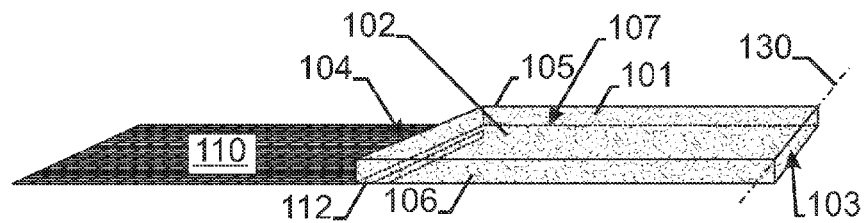

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The following terms are provided solely to aid in the understanding of the inventions.

The term "porosity" P is to be understood as $P=100*(1-d)$ wherein d=(weight of 1 $m^3$ sintered metal fiber medium)/(SF) wherein SF=specific weight per $m^3$ of alloy out of which the metal fibers of the sintered metal fiber medium are provided.

The "air permeability" (also referred to as AP) is measured using the apparatuses as described in NF 95-352, being the equivalent of ISO 4002. The test method of NF 95-352, thus ISO 4002 is modified to accommodate the apparatuses to the larger diameter of the filter volume. This is done by installing an intermediate funnel-shaped element between the filter volume and the inflow aperture of the apparatus. The funnel-shaped element at one side matches the perimeter of the inflow aperture, and at the other side matches the perimeter of the filter casing. The funnel-shaded element is sealed to both the inflow aperture and the filter casing to avoid leakages.

The term "equivalent diameter" of a particular fiber is to be understood as the diameter of an imaginary fiber having a circular radial cross-section, which cross-section having a surface area identical to the average of the surface areas of cross-sections of the particular fiber.

The term "encircle" is to be understood as to pass around. Hence "a fiber which at least partially encircles the axis" means that the fiber at least partially passes around the axis. This may best be seen by projecting the fiber in the direction of the average flow path on a plane AA', being perpendicular to the average flow path. The projection line of the fiber, projected in the direction of the average flow path on a plane AA', being perpendicular to the average flow path, is not necessarily circular or to be an arc of a circle, having its centre coinciding with the projection of the axis on this plane AA'. The best fitting line, i.e. the line which fits closest to the projection line of the fiber, projected in the direction of the average flow path on a plane AA', being perpendicular to the average flow path, has its concave side oriented to the projection of the axis on the plane AA'.

Figure 1B:
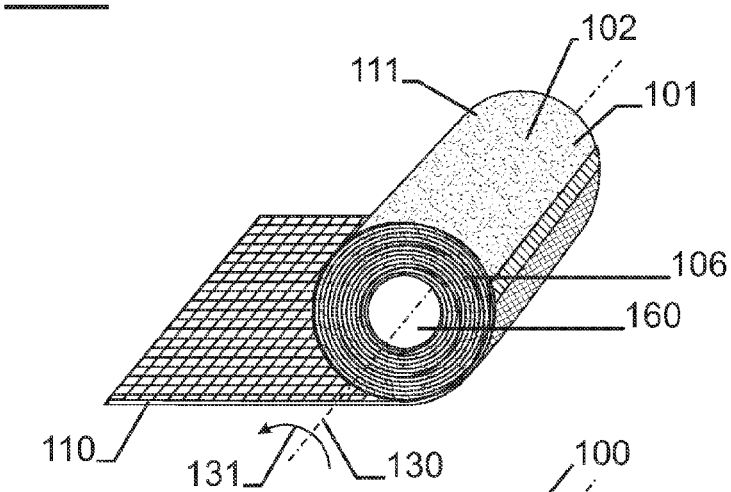
Figure 1C:
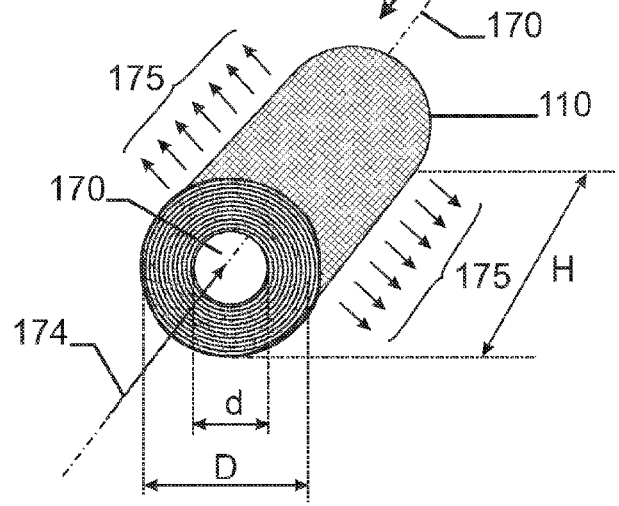

Consecutive steps to provide a filter cartridge according to the present invention are shown in FIGS. 1a to 1c. As shown in a first step in FIG. 1a, a porous consolidated fiber structure 101 comprising fibers 102 is provided. The porous consolidated fiber structure 101 comprises fibers 102. The porous consolidated fiber structure, being for example a fiber web, has a leading edge 103, a tailing edge 104 and two side edges 105 and 106. The porous consolidated fiber structure 101 is for example a substantially rectangular fiber web.

The porous consolidated fiber structure is for example a random air laid web of coil shaved metal fibers of equivalent diameter 35 μm. The web has a width of e.g. between 10 mm to 150 mm and a surface weight of about 300 g/$m^2$. An alternative is a random air laid webs of coil shaved metal fibers of equivalent diameter 22 μm. The web has a width of e.g. between 10 mm to 150 mm and a surface weight of about 450 g/$m^2$. A further alternative is a random air laid webs of bundle drawn metal fibers of equivalent diameter 17 μm. The web has a width of e.g. between 10 mm to 150 mm and a surface weight of about 300 g/$m^2$. Still a further alternative is a random air laid webs of bundle drawn metal fibers of equivalent diameter 12 μm. The web has a width of e.g. between 10 mm to 150 mm and a surface weight of about 200 g/$m^2$.

Preferably, the fibers 102 in the porous structure 101 are substantially oriented in a plane, which is parallel to the web surface 107. In the plane, the orientation of the fibers is random. Some fibers are substantially aligned with the tailing or leading edge, others are extending in a direction parallel to the side edge, still others have an orientation in between.

The porous structure 101 comprising fibers is now wound or coiled about a conduit 160 with coiling axis 130, which coiling axis 130 is parallel to the leading edge 103. The conduit 160 has a diameter d. The winding or coiling is done according to a direction as indicated with arrow 131.

During winding, as the porous structure 101 is substantially rectangular, the side edges 105 respectively 106 may be kept aligned so they, once coiled, are present in one plane. It is self evident that also other shapes of porous structures might be wound and that the sides of the wound structure might be cut to the appropriate length.

Optionally, the wound porous structure is surrounded by a reinforcing structure 110, such as a mesh. Possibly, the coiled or wound structure surrounded by the reinforcing structure is subject to a mechanical or thermal fixation step.

Figure 1D:
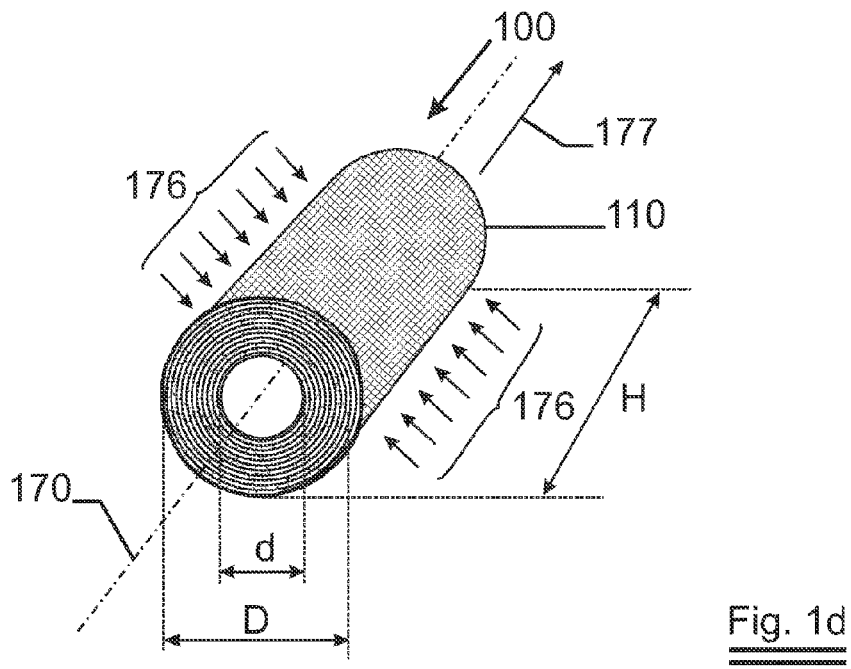

FIG. 1c and FIG. 1d show the filter cartridge 100 in use, i.e. with the indication of the inlet and outlet flow. The filter cartridge 100 has a height H and a diameter D.

In FIG. 1c the filter cartridge 100 has a radial flow from the inside of the filter cartridge 100 to the outside of the filter cartridge 100.

The filter cartridge 100 has an inlet flow 174 substantially parallel with the axis 170 of the filter cartridge 100 and an outlet flow 175 radially outwards the filter cartridge 100. The filter cartridge 100 can be provided with end caps (not shown).

In FIG. 1d the filter cartridge 100 has a radial flow from the outside of the filter cartridge 100 to the inside of the filter cartridge 100.

The filter cartridge has inlet flow 176 radially inwards the filter cartridge 100 and an outlet flow 177 substantially parallel with axis 170 of the filter cartridge 100. The filter cartridge 100 can be provided with end caps (not shown).

As will be explained further in detail, a majority of the fibers 102 (in this embodiment e.g. more than 85%) at least partially encircle the axis 130. This partial encirclement of the fibers can be explained by the fact that the fibers were present in the web and were oriented substantially parallel to the web surface 107. As the web surface 107 now is transformed in to a spiral, spiralling about axis 130, the fibers, which were coplanar with the web surface 107, will follow a path, which encircles at least partially the axis 130 according to this spiral. The fibers, which were present in the web according to a direction which direction had a component parallel to the tailing or leading edge will at least partially encircle the axis 130. The fibers, which were present in the web according to a direction, which direction had a component parallel to the side edges, will at least partially extend in the axial direction of the filter cartridge 100.

The filter cartridges can have a porosity of e.g. 85%, 86%, 87%, 88%, 89%, 90%, 91%, 92%, 93%, 94%, 95%, 96%, 97% or 98%. An air permeability of 225 l/dm$^2$/min could be measured using a pressure drop of 200 Pa between the inflow side and the outflow side. The air permeability is dependent among others the fiber equivalent diameter, the height of the filter cartridge and the porosity.

Figure 2A:
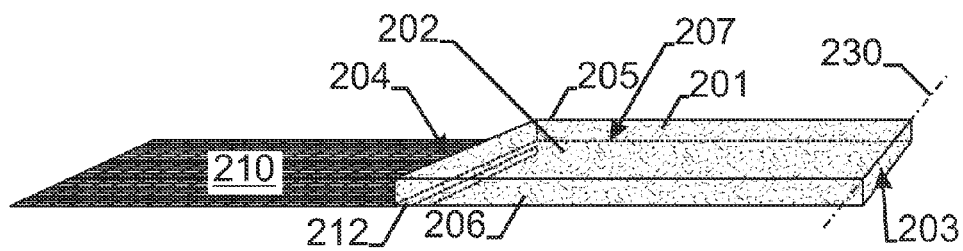
Figure 2B:
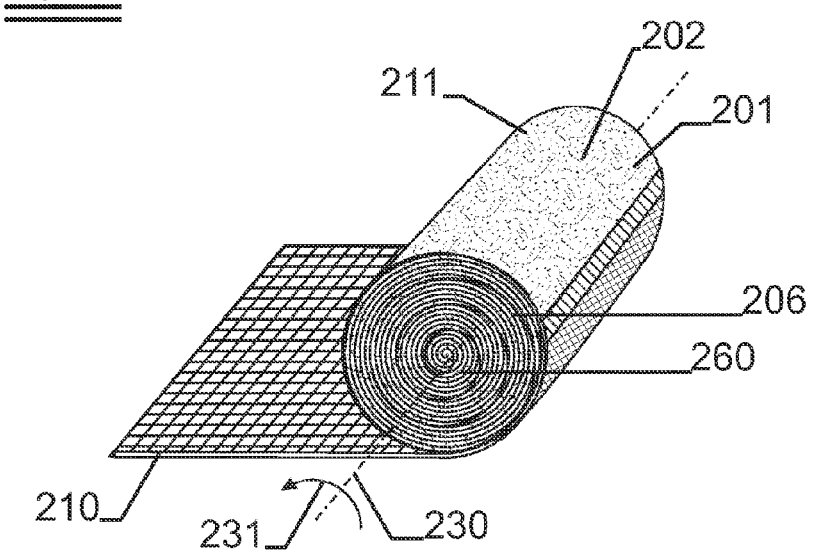

An alternative filter cartridge according to a first aspect of the present invention may be provided by a method of which the consecutive steps are shown in FIGS. 2a to 2c. In this exemplary embodiment, the porous structure 201 has a rectangular or substantially rectangular shape and is coiled in the same manner as described for FIG. 1, with the only difference that no conduit is used, thus coiling the fiber web 201 with coiling axis 230. The fiber web 201 can be coiled in such a way that a central opening is present.

Optionally, a reinforcing structure such as a mesh 210 is coiled around the wound fiber web 201, as shown in FIGS. 2b and 2c. Possibly, this product is then soft sintered or fixed by mechanical means.

FIG. 3 shows the projection of the fibers present in a filter cartridge corresponding to the filter cartridge 100 of FIG. 1.

In FIG. 3, 305 represents the projection of the axis 130.

301 in FIG. 3 shows schematically the projection line 303 of some fibers, projected in the direction of the average flow path 153, on a plane AA', being perpendicular to the average flow path 300.

302 in FIG. 3 shows schematically the projection line 304 of some fibers, on a plane BB', comprising the average flow path projected in the direction perpendicular to this is plane BB'.

As is clear from 301, the projections of the fibers on a plane AA' show a path which at least partially encircle the projection 305 of the axis. Hence, the fibers, which were projected on the plane AA', thus encircle the axis at least partially as well, seen in 3D. The concave side of the best fitting line is oriented to the projection 305.

As is clear from 302, the projections of the fibers on a plane BB' show a path which has a component extending in axial direction. As an example, the fiber, whose projection is represented by 306, extends in axial direction along a length La.

Figure 4B:
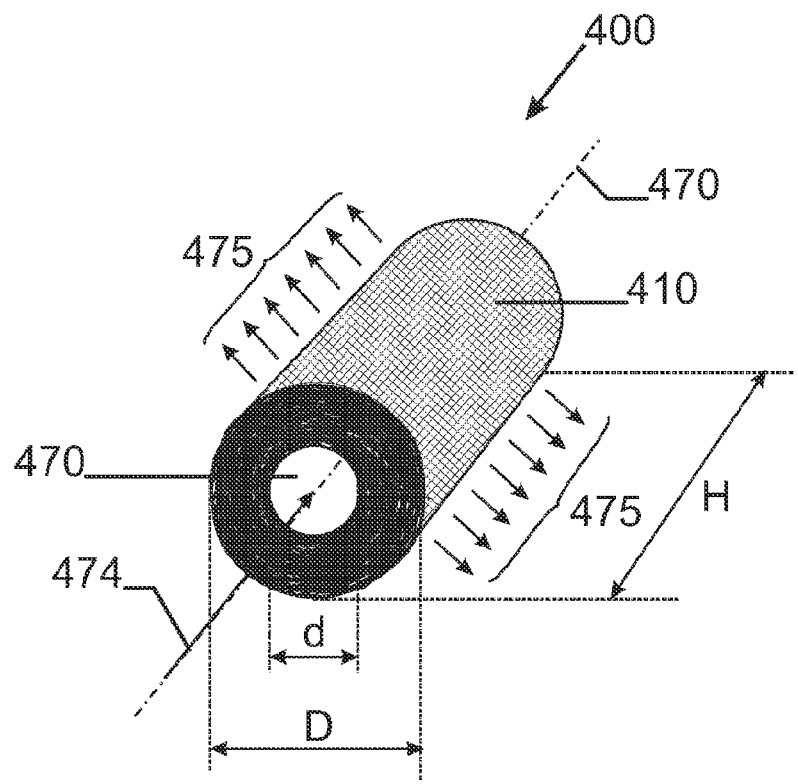
Figure 4C:
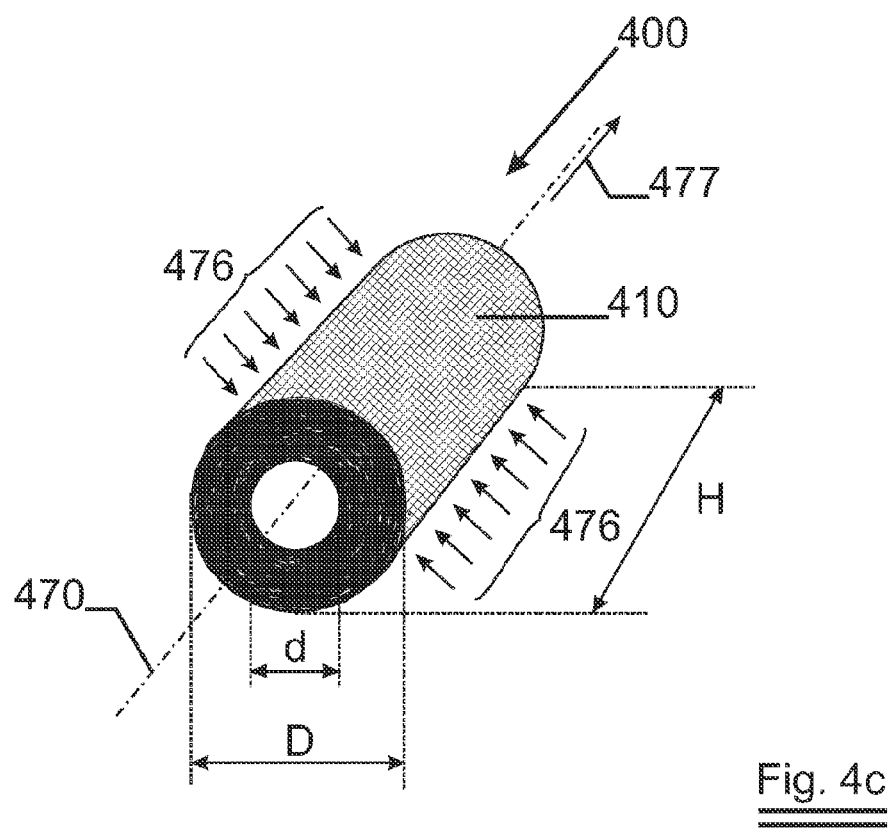

A further embodiment of a filter cartridge according to the first aspect of the present invention may be provided using a method, of which consecutive steps are shown schematically in FIGS. 4a to 4c.

A porous consolidated fiber structure 401 comprising a bundle 408 of fiber 402 is provided. The porous consolidated fiber structure 401 comprises a bundle 408 of fibers 402. The porous consolidated fiber structure 401 has a leading edge 403. The bundle 408 comprises coil shaved or bundle drawn metal fibers having any suitable equivalent diameter e.g. 35 µm or 22 µm. The bundle has a fineness of typically 3 g/m. In case bundles of bundle drawn metal fibers are used, optionally the fibers in the bundle are provided with a crimp to increase the bulkiness of the fibers, hence of the bundle.

The fibers 402 in the porous consolidated fiber structure 401 are substantially oriented in parallel in the bundle 408.

The porous consolidated fiber structure 401 is now wound or coiled about a conduit 432, which conduit defines a coiling axis 430. The winding is done according to a direction as indicated with arrow 431. The bundle 408 is wound around the conduit 432 over a length L1. The bundle is guided by means of a reciprocating guiding means 434, guiding the bundle 408 between two extremes on the shaft (indicated point a and b). The rotation of the conduit and the reciprocating movement of the guiding means wind the bundle in e.g. a helix or spiral path around the conduit 432.

By carefully defining the number of windings at a given position along the length of the shaft, the amount of fibers present at different locations can be determined and varied and a homogeneous porosity can be obtained throughout the complete height H of the filter cartridge.

Optionally, the coiled fiber bundles are further surrounded by a mesh 410, as shown in FIG. 4b. Thereafter, possibly the coiled fiber bundles 408 and the mesh 410 are sintered.

FIG. 4b and FIG. 4c show the filter cartridge 400 in use, i.e. with the indication of the inlet and outlet flow. The filter cartridge 400 has a height H and a diameter D.

In FIG. 4b the filter cartridge 400 has a radial flow from the inside of the filter cartridge 400 to the outside of the filter cartridge 400.

The filter cartridge 400 has an inlet flow 474 substantially parallel with the axis 470 of the filter cartridge 400 and an outlet flow 475 radially outwards the filter cartridge 400. The filter cartridge 400 can be provided with end caps (not shown).

In FIG. 4c the filter cartridge 100 has a radial flow from the outside of the filter cartridge 400 to the inside of the filter cartridge 400.

The filter cartridge has inlet flow 476 radially inwards the filter cartridge 400 and an outlet flow 477 substantially parallel with axis 470 of the filter cartridge 400. The filter cartridge 400 can be provided with end caps (not shown).

Figure 5A:
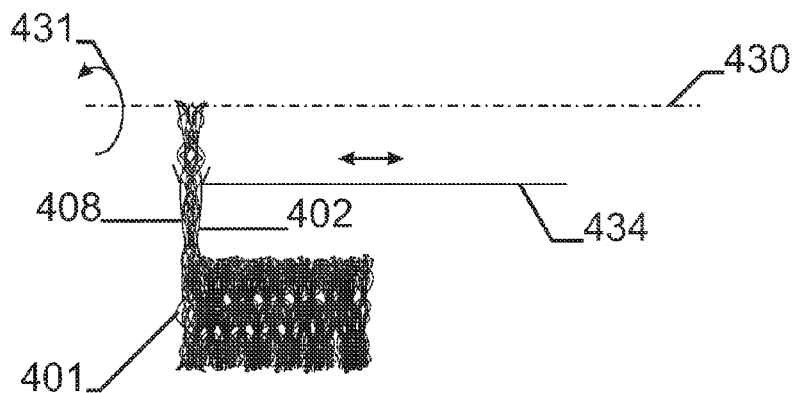
FIGS. 5a and 5b show schematically some of the consecutive steps of a method to provide an alternative filter cartridge comprising a bundle of fibers.
Figure 5B:
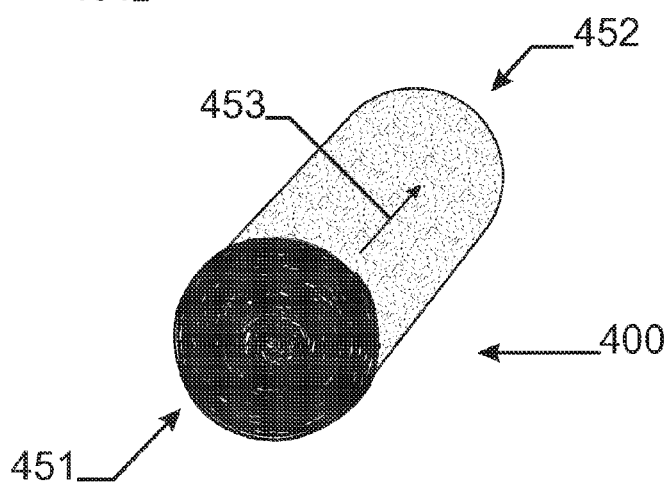

In a further exemplary embodiment, as shown in FIGS. 5a and 5b, a filter cartridge is provided. In this embodiment, the porous consolidated structure 401 is coiled in the same manner as described for FIGS. 4a and 4b, with the only difference that no conduit is used, thus coiling the porous consolidated structure 401 with coiling axis 431.

Figure 6:
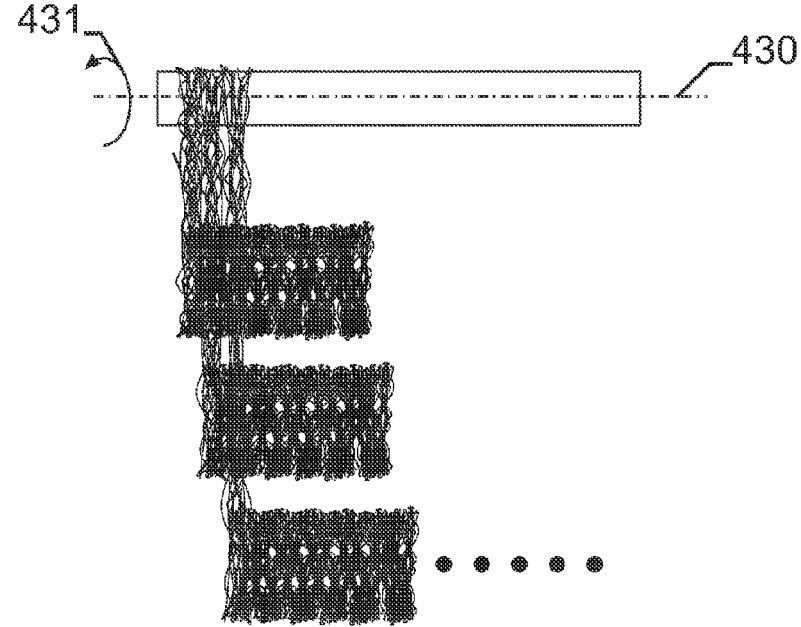
FIG. 6 shows schematically a step of a method to provide a further embodiment of a filter cartridge comprising bundles of fibers.

FIG. 6 shows a further alternative starting position for the production of the filter cartridge according to the present invention. Here a multiple amount of fibre bundles are wound onto the conduit, wherein those fiber bundles are all wound parallel to one another. The amount of fibre bundles used is dependent on the length H of the filter cartridge to be produced. When using this method for producing a filter cartridge according to the present invention, fiber bundles with differing metal compositions might be used.

As will be explained further in detail, a majority of the fibers 402 (e.g. 85% or more) at least partially encircle the axis 430. This is because the fibers were present in the bundle in a direction parallel to the bundle. As the bundle 108 now is transformed into a spiral with axis 430, the fibers follow a path which encircles at least partially the axis 430.

As most of the fibers were present in the bundle 408 along the direction of the bundle, most of the fibers will at least partially encircle the axis 430. As the bundle is helically or spirally wound, the direction of the fibers may be provided with an axial component, hence most fibers will at least partially extend in the axial direction of the filter cartridge.

As will be explained further in detail, a majority of the fibers 402 (in this embodiment e.g. more than 85%) at least partially encircle the axis 430.

FIG. 7 shows the projection of the fibers present in a filter cartridge corresponding to the filter cartridge of FIG. 4.

In FIG. 7, 415 represents the projection of the axis 130.

411 shows schematically the projection line 413 of some fibers, projected in the direction of the average flow path on a plane AA', being perpendicular to the average flow path 153.

412 in FIG. 7 shows schematically the projection line 414 of some fibers, on a plane BB', comprising the average flow path projected in the direction perpendicular to this is plane BB'.

As is clear from 411, the projections of the fibers on a plane AA' show a path which at least partially encircles the projection 415 of the axis.

Hence, the fibers, which are projected on the plane AA', thus encircle the axis at least partially as well, seen in 3D. The concave side of the best fitting line is oriented to the projection 415.

As is clear from 412, the projections of the fibers on a plane BB' show a path which has a component extending in axial direction. As an example, the fiber which projection is 416, extends in axial direction along a length La.

FIG. 8 and FIG. 9 show some embodiments of multicartridge diesel soot particulate filters according to the present invention. Other arrangements for accomplishing the objectives of the methods and filter cartridges embodying the invention will be obvious for those skilled in the art. It is to be understood that although preferred embodiments, specific constructions and configurations, as well as materials, have been discussed herein for devices according to the present invention, various changes or modifications in form and detail may be made without departing from the scope of this invention as defined by the appended claims.

FIG. 8a shows a multicartridge diesel soot particulate filter 800 according to the present invention. The multicartridge filter 800 comprises seven filter cartridges 802. A gas impermeable casing 804 is provided by covering the outer boundary of the filter volume 806. The casing 804 has an inflow side 810 and an outflow side 808 and defines an average flow direction 812. The casing 804 and the filter volume 806 have an axis 814 substantially parallel to the average flow direction 812 and the casing 804 delimits the outer boundary of the filter volume 806 in the direction of the average flow path. The casing 804 is gas impermeable in a radial direction. The filter volume within the casing is filled with a number of filter cartridges 802.

FIG. 8b shows the cross-section of the multicartridge diesel soot particulate filter shown in FIG. 8a.

FIG. 8c shows the multicartridge diesel soot particulate 800 filter having a casing 804. The filter outlet side 808 has seven filter outlets 814.

Figure 9A:
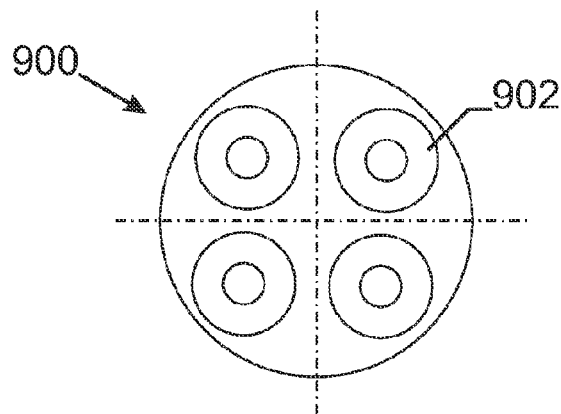
FIGS. 9a and 9b show cross-sections of alternative embodiments of multicartridge diesel soot particulate filters according to the present invention.
Figure 9B:
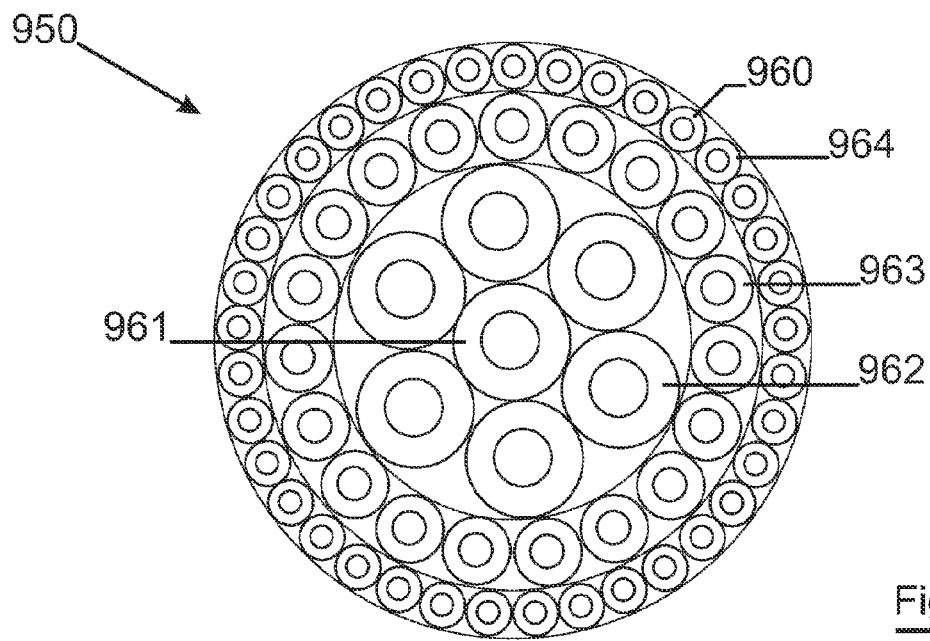

FIGS. 9a and 9b show the cross-sections of other embodiments of multicartridge diesel soot particulate filters according to the present invention. FIG. 9a shows the cross-section of a diesel soot particulate filter 900 having 4 filter cartridges 902.

FIG. 9b shows the cross-section of a diesel soot particulate filter 950 having 1+6+19+37 filter cartridges 960. One filter cartridge 961 is positioned centrally. This central filter cartridge 961 is surrounded by 6 filter cartridges 962 in a first layer, 19 filter cartridges 963 in a second layer and 37 filter cartridges 964 in a third layer.

Figure 10:
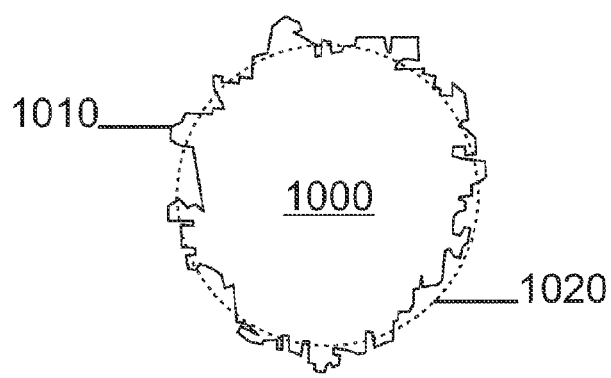
FIG. 10 shows the cross-section of a particular metal fiber.

FIG. 10 shows the cross-section 1000 of a metal fiber having a roughness of at least 1.7. The metal fiber shown has an equivalent diameter of 22 μm. The perimeter of the imaginary fiber having the equivalent diameter of 22 μm is shown by 1020. The perimeter of the cross-section of the real fiber is shown by 1010.

The roughness, defined as the ratio of the perimeter 1010 of the cross-section of the real fiber to the perimeter 1020 of the cross-section of the imaginary fiber having as diameter the equivalent diameter, is 1.9.

The invention claimed is:

1. A radial diesel soot particulate filter cartridge having a central filter cartridge axis,
    wherein said filter cartridge comprises a porous structure,
    wherein said porous structure is coiled around said central filter cartridge axis,
    wherein said porous structure comprises non-sintered metal fibers,
    wherein said metal fibers have a roughness higher than 1.7, said roughness being defined as the ratio of the perimeter of a cross-section of one of the metal fibers to the perimeter of a cross-section of an imaginary fiber,
    wherein said imaginary fiber comprises a fiber having a circular radial cross-section identical in surface area to an average of the surface areas of cross-sections of the one of the metal fibers.

2. A filter cartridge according to claim 1, wherein said filter cartridge has an inlet flow radially inwards said filter cartridge and an outlet flow substantially parallel to said central filter cartridge axis.

3. A filter cartridge according to claim 1, wherein said filter cartridge has an inlet flow substantially parallel to said central filter cartridge axis and an outlet flow radially outwards said filter cartridge.

4. A filter cartridge according to claim 1, wherein said filter cartridge comprises a central conduit, said porous structure being coiled around said central conduit.

5. A filter cartridge according to claim 1, wherein said metal fibers are made from stainless steel.

6. A filter cartridge according to claim 1, wherein said porous structure is a fiber web.

7. A filter cartridge according to claim 1, wherein said porous structure comprises at least one fiber bundle.

8. A multicartridge diesel soot particulate filter comprising a number of radial diesel soot particulate filter cartridges,
   wherein each radial diesel soot particulate filter cartridge has a central filter cartridge axis,
   wherein each filter cartridge comprises a porous structure,
   wherein said porous structure is coiled around said central filter cartridge axis,
   wherein said porous structure comprises non-sintered metal fibers,
   wherein said metal fibers have a roughness higher than 1.7, said roughness being defined as the ratio of the perimeter of a cross-section of one of the metal fibers to the perimeter of a cross-section of an imaginary fiber,
   wherein said imaginary fiber comprises a fiber having a circular radial cross-section identical in surface area to an average of the surface areas of cross-sections of the one of the metal fibers,
   wherein said multicatridge diesel soot particulate filter comprises a casing delimiting the outer boundary of a filter volume, said filter having a central filter axis, said casing having an inflow side and an outflow side defining an average flow direction, said average flow direction being substantially parallel to said central filter axis, said casing being gas impermeable in a radial direction, wherein the central filter cartridge axis of said filter cartridges is substantially parallel to said central filter axis.

9. A multicartridge diesel soot particulate filter according to claim 8, wherein each of said filter cartridges defines a flow in surface $S_{fi\ cartridge}$ and a volume $V_{cartridge}$, wherein the ratio $$\frac{\text{flow in surface filter cartridge } S_{fi\ cartridge}}{\text{volume filter } cartride V_{cartridge}}$$

ranges between 0.01 and 0.1 m²/l.

10. A multicartridge diesel soot particulate filter according to claim 8, wherein the ratio $$\frac{\text{total flow in surface filter } S_{fi\ total}}{\text{power of the engine}}$$

is ranging between 0.001 m²/kW and 0.01 m²/kW, with said total flow in surface filter $S_{fi\ total}$ being the sum of the flow in surfaces $S_{fi\ cartridge}$ of the individual filter cartridges of said multicartridge diesel soot particulate filter.

11. A multicartridge diesel soot particulate filter as defined in claim 8 configured for use in engines having a power higher than 350 kW.

12. A filter cartridge according to claim 1, wherein said metal fibers are made from stainless steel alloys comprising Fe, Al and Cr.

13. A filter cartridge according to claim 1, wherein said metal fibers are made from stainless steel comprising Cr, Al and/or Ni and 0.05 to 0.3% by weight of Y, Ce, La, Hf or Ti.

* * * * *